United States Patent
Liu

(10) Patent No.: US 11,399,338 B2
(45) Date of Patent: Jul. 26, 2022

(54) METHOD FOR DETERMINING PRIORITY OF AREA, NETWORK DEVICE, AND COMPUTER STORAGE MEDIUM

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/896,728

(22) Filed: Jun. 9, 2020

(65) Prior Publication Data

US 2020/0305071 A1 Sep. 24, 2020

Related U.S. Application Data

(63) Continuation of application No. PCT/CN2017/117849, filed on Dec. 21, 2017.

(51) Int. Cl.
| | |
|---|---|
| *H04W 48/18* | (2009.01) |
| *H04W 24/02* | (2009.01) |
| *H04W 28/16* | (2009.01) |
| *H04W 68/02* | (2009.01) |
| *H04W 60/04* | (2009.01) |

(52) U.S. Cl.
CPC ........... *H04W 48/18* (2013.01); *H04W 24/02* (2013.01); *H04W 28/16* (2013.01); *H04W 60/04* (2013.01); *H04W 68/02* (2013.01)

(58) Field of Classification Search
CPC ..... H04W 48/18; H04W 24/02; H04W 28/16; H04W 60/04; H04W 68/02
See application file for complete search history.

(56) References Cited

U.S. PATENT DOCUMENTS

| | | | | |
|---|---|---|---|---|
| 2018/0359337 | A1* | 12/2018 | Kodaypak | ........... H04W 72/048 |
| 2019/0342804 | A1* | 11/2019 | Futaki | ................... H04W 36/14 |
| 2021/0306906 | A1* | 9/2021 | Hua | .................. H04W 28/0289 |

FOREIGN PATENT DOCUMENTS

| | | |
|---|---|---|
| CN | 106879009 A | 6/2017 |
| CN | 107071799 A | 8/2017 |
| WO | 2017140342 A1 | 8/2017 |

OTHER PUBLICATIONS

Extended European Search Report for EP Application 17935709.0 dated Aug. 19, 2020.
3GPP TSG-RAN WG2 Meeting #100; Reno, USA, Nov. 27-Dec. 1, 2017; R2-1712756.
3GPP TSG-RAN2 Meeting #100 R2-1713615; Reno, NV, USA, Nov. 27-Dec. 1, 2017.
International Search Report for PCT/CN2017/117849 dated Sep. 19, 2018.

(Continued)

*Primary Examiner* — Joshua L Schwartz
(74) *Attorney, Agent, or Firm* — Young Basile Hanlon & MacFarlane, P.C.

(57) ABSTRACT

Disclosed are a method for determining a priority of an area, a network device, and a computer storage medium. The method comprises: acquiring information of a network slice, and setting a priority of an area on the basis of the information of the network slice; and configuring the priority of the area to a terminal device.

15 Claims, 1 Drawing Sheet

Acquire information of a network slice, and set a priority of an area based on the information of the network slice — 101

Configure the priority of the area to a terminal device — 102

(56) References Cited

OTHER PUBLICATIONS

3GPP TSG-RAN WG2#99bis; R2-1710172; Prague, Czech Republic, Oct. 9-13, 2017.
3GPP TSG-RAN WG2#100; R2-1712287; Reno, USA, Nov. 27-Dec. 1, 2017 and 3GPP TSG RAN WG2 #99Bis; R2-1710173; Prague, Czech Republic, Oct. 9-13, 2017 (revision of R2-1712287).
3GPP TS 36.300 V13.2.0 (Dec. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).
3GPP TSG SA Meeting #76; Jun. 7-9, 2017, West Palm Beach, Florida, USA; TD SP-170384.
3GPP TS 23.501 V1.0.0 (Jun. 2017); 3rd Generation Partnership Project; Technical Specification Group Services and System Aspects; System Architecture for the 5G System; Stage 2 Release 15).
Korean Office Action with English Translation for KR Application 10-2020-7019789 dated Sep. 15, 2021. (10 pages).
Indian Examination Report for IN Application 202017029251 dated Sep. 9, 2021. (8 pages).
3GPP TR 38.802 V1.0.0, 3rd Generation Partnership Project; Technical Specification Group Radio Access Network; Study on New Radio (NR) Access Technology Physical Layer Aspects (Release 14), R1-1613687, Nov. 2016. (64 pages).
Japanese Office Action with English Translation for JP Application 2020532964 dated Dec. 14, 2021. (10 pages).
Korean Notice of Final Rejection with English Translation for KR Application 1020207019789 dated Mar. 25, 2022. (8 pages).

* cited by examiner

METHOD FOR DETERMINING PRIORITY OF AREA, NETWORK DEVICE, AND COMPUTER STORAGE MEDIUM

CROSS-REFERENCE TO RELATED APPLICATION(S)

This application is a continuation application of International Application No. PCT/CN2017/117849 filed on Dec. 21, 2017, of which the entire disclosure is hereby incorporated by reference.

TECHNICAL FIELD

The present disclosure relates to the technical field of information processing, in particular to a method for determining a priority of an area, a network device, and a computer storage medium.

BACKGROUND

When 5G is widely mentioned, network slicing is a most discussed technology. To realize the network slicing, Network Function Virtualization (NFV) is a prerequisite. Basically, a main idea of the NFV is to deploy all network function software (i.e., MME, S/P-GW and PCRF in a packet core, and DU in a RAN) to virtual machines on commercial servers, instead of separately deploying it on dedicated network devices thereof. In this way, RAN acts as an edge cloud while core functions act as a core cloud. Connections between VMs located in the edge cloud and core cloud are configured using software defined network (SDN). Then, a slice is created for each service (i.e., a phone slice, a Massive Internet of Things slice, a Mission-critical Internet of Things slice).

Generally, network handover is configured in a specific area, such as a specific frequency band or a specific cell or a specific registration area or a specific paging area. When a terminal is configured with a network slice, the network will set different area priorities based on the network slice configured by the terminal. For example, if network handover information configured by the terminal is a Massive Internet of Things (MIoT) type, then an access network will set a higher priority to an area configured with the MIoT type. When performing a cell reselection, the terminal may preferably select the area with the higher priority. The same terminal may be configured with multiple network slices, but at present, in this case, how the access network sets a priority of an area has not been determined.

SUMMARY

To solve the above technical problem, implementations of the present disclosure provide a method for determining a priority of an area, a network device, and a computer storage medium.

An implementation of the present disclosure provides a method for determining a priority of an area, applied to a network device. The method includes: acquiring information of a network slice, and setting a priority of an area based on the information of the network slice; and configuring the priority of the area to a terminal device.

An implementation of the present disclosure provides a network device. The network device includes a processing unit and a communication unit. The processing unit acquires information of a network slice, and sets a priority of an area based on the information of the network slice. The communication unit configures the priority of the area to a terminal device.

An implementation of the present disclosure provides a network device. The network device includes a processor and a memory for storing a computer program that is capable of being run on the processor. Herein, the processor is configured to, when running the computer program, implement the acts of the above method.

An implementation of the present disclosure provides a computer storage medium. The computer storage medium stores computer-executable instructions. When the computer-executable instructions are executed, acts of the above method are implemented.

DETAILED DESCRIPTION

To understand features and technical contents of implementations of the present disclosure in more detail, implementations of the implementations of the present disclosure will be described in detail below with reference to the drawings, which are used for reference and description only and are not intended to limit the implementations of the present disclosure.

Implementation One

Figure 1:
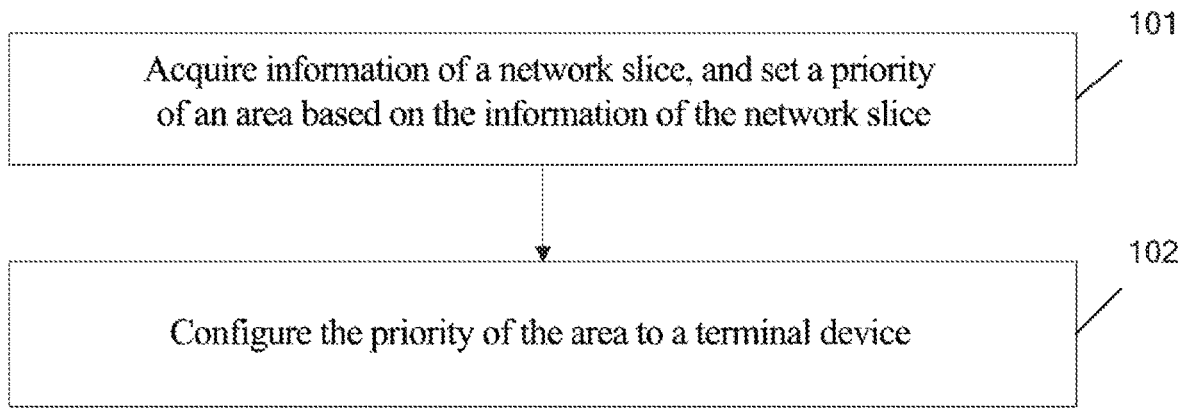
FIG. 1 is a schematic flowchart of a method for determining a priority of an area according to an implementation of the present disclosure.

An implementation of the present disclosure provides a method for determining a priority of an area, applied to a network device. As shown in FIG. 1, the method includes the following acts 101 and 102.

In act 101, information of a network slice is acquired, and a priority of an area is set based on the information of the network slice.

In act 102, the priority of the area is configured to a terminal device.

The technical solution provided by the present implementation may enable a network device to set a priority of an area based on information of a network slice, and then to configure the priority of the area to a terminal device.

It should be understood that in the present implementation, the network device sets the priority of the area for the terminal device.

A first device sets a priority of an area based on information of a network slice provided by a second device, and provides the priority of the area to a terminal. That is, a device in a network provides the information of the network slice to another device, and then, the priority of the area corresponding to the terminal is set based on the information.

Specifically, acquiring the information of the network slice includes acquiring the information of the network slice from one of a core network, an access network, the terminal device and an operation and maintenance device. That is, information of a corresponding network slice may be acquired from the core network or the access network.

Further, modes of acquiring the information of the network slice from different devices are described below.

In a first mode, when the information of the network slice is acquired from the terminal device, the terminal device directly acquires the information of the network slice, or acquires the information of the network slice through a configuration of a network side.

Herein, a mode of directly acquiring, by the terminal device, the information of the network slice may be by a way of subscription. Specifically, the way of subscription may be that a user negotiates with an operator in advance to acquire a subscription result, and path information for the user to acquire the information of the network slice may further be included in the way of subscription. It may be understood that the subscription may include various types of information, such as address information of, routing information of, and subscription password of a subscription server from which the user acquires information of network handover, which will not be repeated here.

The terminal device may further directly accept the information of the network slice configured by the network side. For example, the information of the network slice configured by a management network device side is directly acquired from the management network device side corresponding to the terminal device. A specific acquiring way will not be described in detail in the present implementation.

That is, the terminal may acquire the information of the network slice by the way of subscription; or, acquire the information of the network slice through a network configuration. In this mode, based on the information of the network slice provided by the terminal, a priority of an area is set and provided to the terminal.

In a second mode, when the information of the network slice is acquired from the core network, the core network is capable of acquiring the information of the network slice from a subscription server of the terminal device, or from the terminal device, or from an access network, or from another core network.

That is, before performing the act 101, the network side further needs to know which terminal device needs to be set with the priority of the area. Accordingly, when the information of the network slice is acquired, it needs to acquire, in conjunction with relevant information of the terminal device, the corresponding information from a subscription server, an access network or another core network corresponding to the terminal device.

Herein, the another core network may be a core network of another system as long as it is not the core network corresponding to the current terminal device.

That is, the core network may acquire the information of the network slice from the subscription server of the terminal or from the terminal or from the access network.

It should be further pointed out that the time or opportunity of acquiring information from another core network may be in a procedure of network handover of the terminal device, and at this time, the core network may acquire the information of the network slice from the another core network. Alternatively, it may be understood that the information of the network slice is acquired from an original core network accessed by the terminal device.

In addition, modes for acquiring the information of the network slice from the access network and the operation and maintenance device may be the same as or similar to the above two modes, and will not be exhaustively enumerated here.

Further, the area is at least one of a beam area, a cell, a frequency band, a frequency point, a registration area, a tracking area, and a paging area. For example, the beam area may be a cell covered by at least one beam. In addition, different cells, different frequency bands, or different frequency points are divided into different areas. Of course, it may further be possible to divide bands of several different frequency bands into the same area, which is not limited here. It may be understood that division modes of the registration area, tracking area and paging area other than the beam area, the cell, the frequency band, the frequency point may be the same as those described above and will not be repeated here.

Based on the above solution introduced in the present implementation, a description is given for the information of the network slice. The information of the network slice includes at least one of the following: priority information of the network slice; level information of the network slice; attribute information of the terminal device; and a correspondence relationship between network slices and areas.

Herein, the priority information of the network slice may be divided into N priorities, such as high, medium and low priorities, or 1st, 2nd, 3rd and 4th priorities, etc.

The level information of the network slice may have multiple levels. For example, it may be divided into 10 (of course, may alternatively be more or less than 10) levels. Further, with respect to the level information of the network slice, the level information of the network slice may further correspond to the priority information of the network slice. For example, it may be configured that levels 1-3 correspond to a high priority, levels 4-8 correspond to a medium priority, and levels 9-10 correspond to a low priority.

A usage mode of the attribute information of the terminal device may be that the priority of the network slice is determined based on the attribute information of the terminal device, and the priority of the area is set based on the priority of the network slice. For example, if the terminal is a Massive Internet of Things (MIoT) type terminal, a corresponding network slice type has a higher priority. Or, the terminal does not belong to a certain network slice attribute, then the network slice has a lower priority.

A correspondence relationship between network slices and areas may be priority information of the network slice and the area. That is, according to the priority information of the network slice, the priority information of the area corresponding to the network slice is determined. For example, the priority of the network slice may correspond to a priority corresponding to an area or several areas that are indicated by the network slice, so when a priority of an area is set for a terminal device, an area corresponding to a network slice with a highest priority may be selected to set for the terminal device based on priorities of network slices corresponding to areas. In other words, there is a preset correspondence relationship between network slices and areas, which will not be repeated here.

It may be seen that by adopting the above solution, information of the network slice can be acquired, a priority of an area is set based on the information of the network slice, and the priority of the area is configured to a terminal device. Thus, after a terminal is configured with a network slice, and under a scenario that the same terminal may be configured with multiple network slices, it can be realized that a priority of an area corresponding to the terminal device can be set based on information of the network slice.

Implementation Two

Figure 2:
FIG. 2 is a schematic diagram of structure of a network device according to an implementation of the present disclosure.

An implementation of the present disclosure provides a network device. As shown in FIG. 2, the network device includes a processing unit 21 and a communication unit 22.

The processing unit 21 acquires information of a network slice and sets a priority of an area based on the information of the network slice.

The communication unit 22 configures the priority of the area to a terminal device.

The technical solution provided by the present implementation may enable the network device to set a priority of an area based on information of a network slice, and then to configure the priority of the area to a terminal device.

It should be understood that in the present implementation, the network device sets the priority of the area for the terminal device.

A first device sets a priority of an area based on information of a network slice provided by a second device, and provides the priority of the area to a terminal. That is, a device in a network provides the information of the network slice to another device, and then, the priority of the area corresponding to the terminal is set based on the information.

Specifically, the processing unit 21 acquires the information of the network slice from one of a core network, an access network, the terminal device, and an operation and maintenance device through the communication unit 22. That is, information of a corresponding network slice may be acquired from the core network or the access network.

Further, modes of acquiring the information of the network slice from different devices are described below.

In a first mode, when the information of the network slice is acquired from the terminal device, the terminal device directly acquires the information of the network slice, or acquires the information of the network slice through a configuration of a network side.

Herein, a mode of directly acquiring, by the terminal device, the information of the network slice may be by a way of subscription. Specifically, the way of subscription may be that a user negotiates with an operator in advance to acquire a subscription result, and path information for the user to acquire the information of the network slice may further be included in the way of subscription. It may be understood that the subscription may include various types of information, such as address information of, routing information of, and subscription password of a subscription server from which the user acquires information of network handover, which will not be repeated here.

The terminal device may further directly accept the information of the network slice configured by the network side. For example, the information of the network slice configured by a management network device side is directly acquired from the management network device side corresponding to the terminal device. A specific acquiring way will not be described in detail in the present implementation.

That is, the terminal may acquire the information of the network slice by the way of subscription; or, acquire the information of the network slice through a network configuration. In this mode, based on the information of the network slice provided by the terminal, a priority of an area is set and provided to the terminal.

In a second mode, when the information of the network slice is acquired from the core network, the core network is capable of acquiring the information of the network slice from a subscription server of the terminal device, or from the terminal device, or from an access network, or from another core network.

That is, the network side further needs to know which terminal device needs to be set with the priority of the area. Accordingly, when the information of the network slice is acquired, it needs to acquire, in conjunction with relevant information of the terminal device, corresponding information from a subscription server, an access network or another core network corresponding to the terminal.

Herein, the another core network may be a core network of another system as long as it is not the core network corresponding to the current terminal device.

That is, the core network may acquire the information of the network slice from the subscription server of the terminal or from the terminal or from the access network.

It should be further pointed out that the time or opportunity of acquiring information from another core network may be in a procedure of network handover of the terminal device, and at this time, the core network may acquire the information of the network slice from the another core network. Alternatively, it may be understood that the information of the network slice is acquired from an original core network accessed by the terminal device.

In addition, modes for acquiring the information of the network slice from the access network and the operation and maintenance device may be the same as or similar to the above two modes, and will not be exhaustively enumerated here.

Further, the area is at least one of a beam area, a cell, a frequency band, a frequency point, a registration area, a tracking area, and a paging area. For example, the beam area may be a cell covered by at least one beam. In addition, different cells, different frequency bands, or different frequency points are divided into different areas. Of course, it may further be possible to divide bands of several different frequency bands into the same area, which is not limited here. It may be understood that division modes of the registration area, tracking area and paging area other than the beam area, the cell, the frequency band, the frequency point may be the same as those described above and will not be repeated here.

Based on the above solution introduced in the present implementation, a description is given for the information of the network slice. The information of the network slice includes at least one of the following: priority information of the network slice; level information of the network slice; attribute information of the terminal device; and a correspondence relationship between network slices and areas.

Herein, the priority information of the network slice may be divided into N priorities, such as high, medium and low priorities, or the 1st, 2nd, 3rd and 4th priorities, etc.

The level information of the network slice may have multiple levels. For example, it may be divided into 10 (of course, may alternatively be more or less than 10) levels. Further, with respect to the level information of the network slice, the level information of the network slice may further correspond to the priority information of the network slice. For example, it may be configured that levels 1-3 correspond to a high priority, levels 4-8 correspond to a medium priority, and levels 9-10 correspond to a low priority.

A usage mode of the attribute information of the terminal device may be that the priority of the network slice is determined based on the attribute information of the terminal device, and the priority of the area is set based on the priority of the network slice. For example, if the terminal is a MIoT type terminal, a corresponding network slice type has a higher priority. Or the terminal does not belong to a certain network slice attribute, then the network slice has a lower priority.

A correspondence relationship between network slices and areas may be priority information of the network slice and the area. That is, according to the priority information of the network slice, the priority information of the area corresponding to the network slice is determined. For example, the priority of the network slice may correspond to a priority corresponding to an area or several areas that are indicated by the network slice, so when a priority of an area is set for a terminal device, an area corresponding to a network slice with a highest priority may be selected to set for the terminal device based on priorities of network slices corresponding to areas. In other words, there is a preset correspondence relationship between network slices and areas, which will not be described here.

It may be seen that by adopting the above solution, information of a network slice can be acquired, a priority of an area is set based on the information of the network slice, and the priority of the area is configured to a terminal device. Thus, after a terminal is configured with a network slice, and under a scenario that the same terminal may be configured with multiple network slices, it can be realized that a priority of an area corresponding to the terminal device can be set based on information of the network slice.

Figure 3:
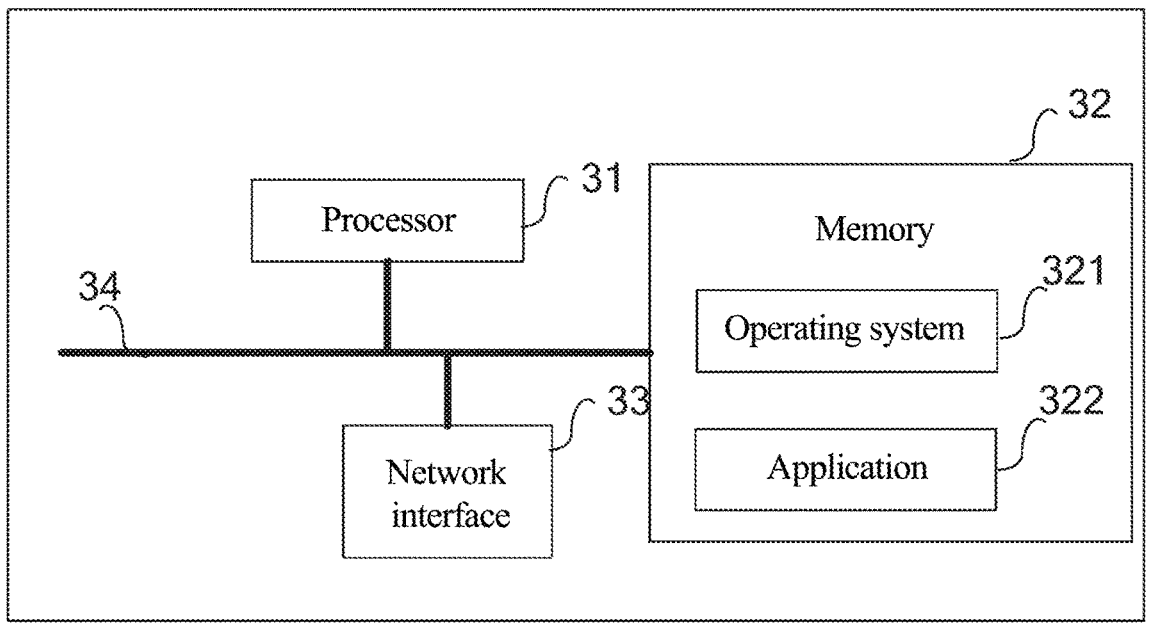
FIG. 3 is a schematic diagram of a hardware architecture according to an implementation of the present disclosure.

An implementation of the present disclosure further provides an architecture of hardware composition of a network device. As shown in FIG. 3, the network device includes at least one processor 31, a memory 32, and at least one network interface 33. Various components are coupled together by a bus system 34. It may be understood that the bus system 34 is used for implementing connections and communications between these components. In addition to a data bus, the bus system 34 includes a power bus, a control bus, and a status signal bus. However, for clarity, all kinds of buses are uniformly referred to as the bus system 34 in the FIG. 3.

It should be understood that the memory 32 in the implementation of the present disclosure may be a volatile memory or a non-volatile memory, or it may include both the volatile and non-volatile memory.

In some implementations, the memory 32 stores the following elements, executable modules or data structures, or subsets thereof, or extended sets thereof: an operating system 321 and an application 322. Herein, the processor 31 is configured to be capable of processing acts in the method of the implementation one, which will not be described here.

An implementation of the present disclosure provides a computer storage medium. The computer storage medium stores computer-executable instructions, and when the computer executable-instructions are executed, acts in the method of the implementation one are implemented.

The above device in the implementations of the present disclosure may further be stored in a computer readable storage medium when it is implemented in the form of a software function module and sold or used as an independent product. Based on this understanding, the technical solutions in the implementations of the present disclosure, in essence, or the part contributing to the prior art, may be embodied in the form of a software product stored in a storage medium, including several instructions causing a computer device (which may be a personal computer, a server, or a network device, etc.) to perform all or part of the methods described in various implementations of the present disclosure. The aforementioned storage medium includes a U disk, a mobile hard disk, a read-only memory (ROM), a magnetic disk or an optical disk, and other media capable of storing program codes. Thus, the implementations of the present disclosure are not limited to any specific combination of hardware and software.

Correspondingly, an implementation of the present disclosure further provides a computer storage medium in which a computer program is stored, and the computer program is configured to execute the data scheduling method in the implementations of the present disclosure.

Although the preferable implementations of the present disclosure have been disclosed for illustrative purposes, those skilled in the art will recognize that various modifications, additions and substitutions are also possible, and therefore, the scope of the present disclosure should not be limited to the above implementations.

What is claimed is:

1. A method for determining a priority of an area, applied to a network device, the method comprising:
    acquiring information of a network slice, and setting a priority of an area based on the information of the network slice, wherein the information of the network slice comprises attribute information of a terminal device; and
    configuring the priority of the area to the terminal device.

2. The method of claim 1, wherein the information of the network slice further comprises at least one of:
    level information of the network slice;
    or
    a correspondence relationship between network slices and areas.

3. The method of claim 1, wherein acquiring the information of the network slice comprises:
    acquiring the information of the network slice from one of a core network, an access network, the terminal device and an operation and maintenance device.

4. The method of claim 1, wherein the area is at least one of:
    a beam area, a cell, a frequency band, a frequency point, a registration area, a tracking area, or a paging area.

5. The method of claim 3, wherein when the information of the network slice is acquired from the terminal device, the terminal device is capable of directly acquiring the information of the network slice, or acquiring the information of the network slice through a configuration of a network side.

6. The method of claim 3, wherein when the information of the network slice is acquired from the core network, the core network is capable of acquiring the information of the network slice from a subscription server of the terminal device, or from the terminal device, or from the access network, or from another core network.

7. A network device, comprising a processor, and a network interface, wherein
    the processor is configured to acquire information of a network slice, and set a priority of an area based on the information of the network slice, wherein the information of the network device comprises attribute information of a terminal device; and
    the processor is further configured to configure, through the communication interface, the priority of the area to the terminal device.

8. The network device of claim 7, wherein the information of the network slice further comprises at least one of:
    level information of the network slice;
    or
    a correspondence relationship between network slices and areas.

9. The network device of claim 7, wherein the processor is configured to acquire the information of the network slice from one of a core network, an access network, the terminal device, and an operation and maintenance device through the network interface.

10. The network device of claim 7, wherein the area is at least one of:
    a beam area, a cell, a frequency band, a frequency point, a registration area, a tracking area, or a paging area.

11. The network device of claim 9, wherein when the information of the network slice is acquired from the terminal device, the terminal device is capable of directly acquiring the information of the network slice, or acquiring the information of the network slice through a configuration of a network side.

12. The network device of claim 9, wherein when the information of the network slice is acquired from the core network, the core network is capable of acquiring the information of the network slice from a subscription server of the terminal device, or from the terminal device, or from the access network, or from another core network.

13. A non-transitory computer storage medium storing computer-executable instructions, wherein when the computer-executable instructions are executed, acts of the method according to claim 1 are implemented.

14. The method of claim 1, wherein the attribute information of a terminal device comprises a type of the terminal device, wherein the type of the terminal device comprises a Massive Internet to Things type.

15. The network device of claim 7, wherein the processor is configured to determine a type of the terminal device, wherein the type of the terminal device comprises a Massive Internet to Things type.

* * * * *